Nov. 29, 1949   E. M. BROGDEN   2,489,744
PROCESS OF TREATING CITROUS FRUIT
Filed Dec. 23, 1946

Inventor
E. M. Brogden
By Mason, Fenwick & Lawrence
Attorneys

Patented Nov. 29, 1949

2,489,744

UNITED STATES PATENT OFFICE 2,489,744

PROCESS OF TREATING CITROUS FRUIT

Ernest M. Brogden, Orlando, Fla.

Application December 23, 1946, Serial No. 717,945

15 Claims. (Cl. 99—168)

This invention relates to a new and improved process for treating fresh citrus fruit in preparation for market.

The object of this invention is to provide a method for preventing the decay of fresh citrus fruit for a period of time which is considerably longer than that obtainable by methods presently in use, by applying to the surface of the fruit an aqueous fluid treating medium containing sodium orthophenyl-phenate, a chemical which has marked bactericidal and fungicidal properties without the usual concomitant damaging of the fruit by the treating chemical.

Another object is to incorporate the hitherto separate processes of treating fresh citrus fruit with fungicidal media to retard decay and with wax emulsions to retard shrinkage and impart a pleasing polish into a single, economical operation which minimizes deleterious handling of the fruit.

Still another object is to prevent the deterioration of fresh citrus fruit which frequently results from subjecting them to the decay accelerating conditions of the standard coloring proating procedure by giving the fruit a preliminary treatment with an aqueous solution of sodium orthophenyl-phenate without permitting the usual concomitant damaging of the fruit by the active chemical.

Other objects and advantages of my invention will become apparent from the following description.

In describing the process, reference is had to the drawing in which.

Figure 1:
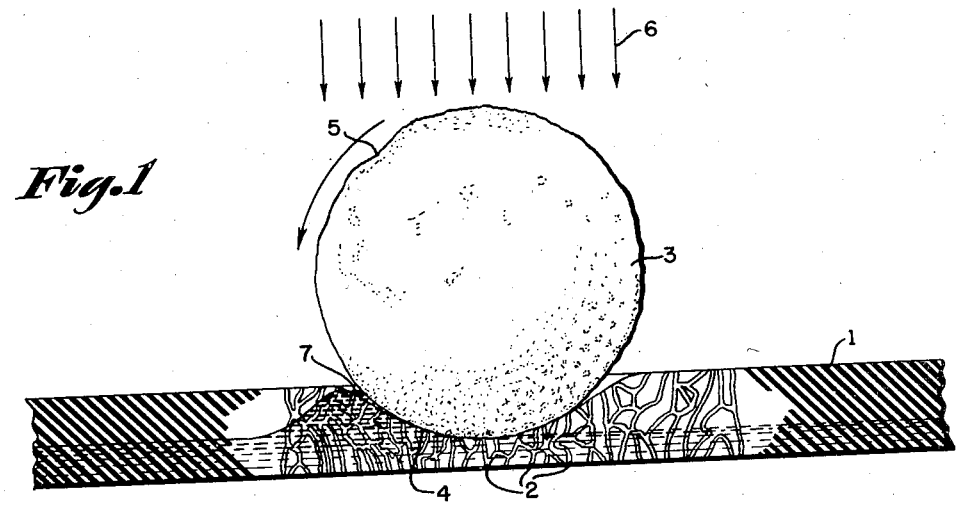
Fig. 1 is a longitudinal section through a sheet of foamed rubber with a fruit resting gravitationally thereon.
Figure 2:
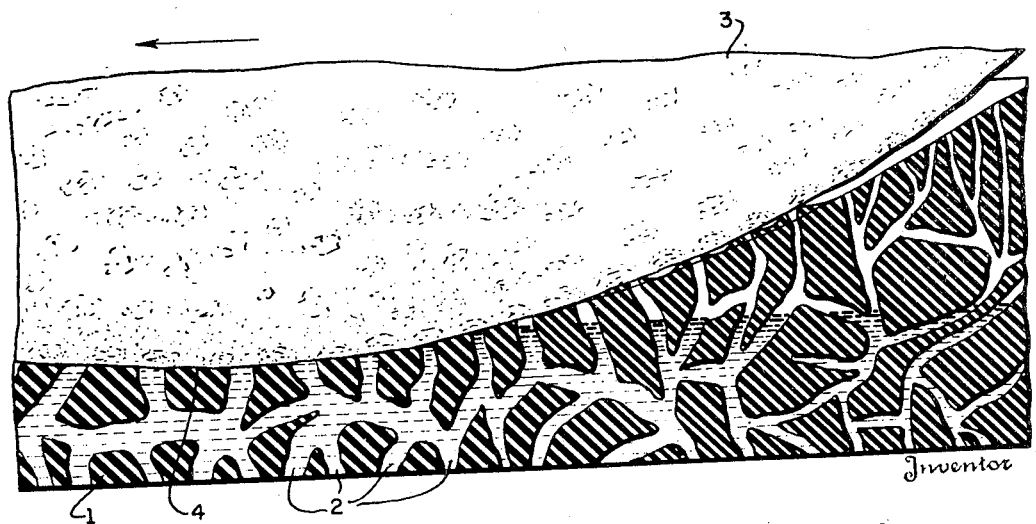
Fig. 2 is a fragmentary view on an enlarged scale illustrating the action of the foamed rubber with respect to the fruit surface.

It is well known that fresh citrus fruits possess a marked tendency to decay because of the development of bacterial and fungicidal infections particularly in the vulnerable stem end of the fruit and in skin wounds or bruises. To retard such deterioration it has been the practice to treat the surface of the fruit with decay-inhibiting agents. In addition to their fungicidal properties, such agents must not cause damage to the fruit and must be non-toxic for purposes of human consumption.

It has been known for many years that sodium orthophenyl-phenate is remarkably effective in preserving citrus fruit against the decay caused by bacterial and fungicidal organisms when applied to the surface of the fruit in aqueous solution. Sodium orthophenyl-phenate retards decay for a considerably longer period of time than borax which is currently in use. This chemical has the further advantage of being non-toxic to warm blooded animals. However sodium orthophenyl-phenate possesses the unfortunate property of seriously damaging the appearance of the fruit by discoloring and pitting the surface when applied in concentrations as low as 1½ percent by any of the hitherto known methods, thus rendering it unmarketable.

I have found that I can utilize the remarkable bactericidal and fungicidal properties of sodium orthophenyl-phenate and at the same time prevent its damaging the appearance of citrus fruit when I apply it by means of my new method which leaves a barely perceptible film of the treating fluid on the fruit and which is fully described in my copending patent application Serial No. 679,853.

My process consists essentially of thoroughly wetting the fruit with an aqueous fluid treating medium containing sodium orthophenyl-phenate in the desired decay inhibiting concentration and then blotting off all of the treating fluid except for an exceedingly thin film adhering to the surface. In depressions in the generally rotund surface of the fruit, such as those caused by the stem, wounds or bruises, somewhat more of the solution is permitted to remain. This is important since such depressions are particularly vulnerable to the attack of decay producing organisms.

The process may best be described in connection with a single apparatus element, a sheet of "foamed rubber" which I have employed as the blotting medium.

The foamed rubber, which may be natural or synthetic, is a commercial product characterized by a multiplicity of intercommunicating cells or foramina closely distributed throughout its texture and opening into the surfaces of the sheet. If liquid is poured on top of the sheet, it will quickly discharge through the bottom or laterally.

The foamed rubber sheet is compressible, that is to say, it yields under the weight of the fruit. The upper surface of the sheet is normally plane. The thickness of the sheet is not vital to the invention except that it should be sufficiently thick so that when the sheet is wetted with a fluid medium the top of the liquid layer retained by the sheet by virtue of capillarity and surface tension, will be below the top surface of the sheet.

For oranges I have used a sheet about ½ inch thick but this thickness may be varied.

The foamed rubber sheet, which is employed in my process as a blotting agent to remove excess fluid treating medium from the surface of the fruit, is preferably made thoroughly wet either with water or with the fluid treating medium before use. Wetting may be accomplished by immersing the sheet in the fluid and kneading or squeezing it while submerged so as to displace the air in the cells with water, thereby wetting the surface of the cells, or by showering the sheet with the liquid. Surplus liquid may be squeezed out or it will drain out automatically as soon as the sheet is removed from the liquid or the showering ceases. Preferably the sheet is supported to facilitate such drainage. Some of the liquid is retained in the sheet due to capillary action. This condition of wetness is believed to play an important part in the blotting function as will appear. The preliminary wetting of the foamed rubber sheet prior to use is not essential, however, since the same result may be obtained either by showering the fruit with the fluid treating medium directly over the rubber sheet or by rolling fruit carrying a surplus of the fluid over it. The surplus fluid will gradually be absorbed into the foamed rubber and impart to it the desired degree of wetness.

In carrying out my process, the citrus fruit such as oranges, grapefruit, tangerines, lemons and the like is thoroughly wet down with the fluid treating medium containing the sodium orthophenyl-phenate in the desired concentration preferably by showering the fruit. Fruit treated in this manner carries a surplus of the fluid treating medium. By surplus, is meant the excess of fluid which clings to the fruit in masses of appreciable depth such as drops, droplets and the like.

The citrus fruit carrying the surplus of fluid treating medium is immediately placed on the foamed rubber sheet and rolled thereupon in such directions as to bring all parts of the general rotund surface of the fruit into contact with the sheet. Since the fruit rolls in a depression which it makes in the foamed rubber, a relatively wide zone of its surface will be blotted at a time, minimizing the number of direction changes in the motion of rolling necessary to remove surplus liquid from the entire rotund surfaces. Only one passage of an area of the fruit surface over the sheet is required to reduce the moisture content on that area to a state of mere uniform dampness.

The blotting action of the foamed rubber, which is described in detail in the aforementioned patent application Serial No. 679,853, is apparently due to the combined effect of capillarity and suction and is illustrated in the accompanying drawings.

The cells 2 of the foamed rubber sheet 1 substantially all contain some fluid, either adhering to their walls or filling them due to the capillary action of the network of minute intercommunicating channels. The weight of the fruit 3 produces a depression 4 in the sheet. It reduces the thickness of the sheet by collapsing or condensing the cells beneath the fruit forcing the liquid out of these cells and causing it to fill the cells in an outlying region adjacent the condensed cells. The displaced water does not diffuse through the mass of the sheet, but due to surface tension and capillarity it remains concentrated in this outlying region. The point of maximum condensation of the cells produced by the weight of the object is, of course, directly beneath the center of gravity of the object.

When the fruit is rolled along the sheet, the center of gravity shifts and through the inherent resiliency of the rubber, the compressed cells on the trailing side quickly recover their normal open shape. The inertia of the displaced water, probably aided by surface tension and capillarity, prevents the water from immediately returning into the reexpanded cells from which it was displaced so that if the object is rolled at a rate of speed such that the mouths of the surface cells on the trailing side can maintain contact with the surface of the fruit during a material part of the expanding phase of said cells, they act as suction cups, withdrawing liquid from the surface of the fruit with relatively great force. Care must be exercised to roll the fruit at a rate of speed which will permit the aforedescribed suction action. If the fruit is rolled too rapidly the surface of the fruit on the trailing side leaves the surface of the sheet before the surface cells have materially reexpanded and their suction effect is lost. However it is not to be inferred that the rolling speed of the object must be unduly slow to effect the desired thorough blotting action, for I have successfully employed the foamed rubber as a blotting agent in the treatment of citrus fruit on a commercial scale.

Since the stem end of citrus fruit and wounds or bruises on the rind are particularly vulnerable to decay-producing organisms, it is desirable that somewhat more than a mere film of the fluid treating medium be permitted to remain in such areas. This is very satisfactorily provided for by my blotting process since such vulnerable areas form depressions in the surface of the fruit. As shown in Fig. 1, the depression 5 at the stem end will not contact the foamed rubber sheet and the fluid treating medium at this point will not be appreciably disturbed by the blotting. Similarly, the blotting does not remove the absorbed treating fluid from the wounds and bruises.

The fruit leaves the foamed rubber sheet with a barely perceptible, uniformly distributed film of the treating fluid which dries very quickly.

I have found that citrus fruit which is made thoroughly wet with aqueous solutions of sodium orthophenyl-phenate, even in concentrations considerably higher than is required to inhibit decay, and then subjected to the blotting action of the foamed rubber sheets will show no perceptible evidence of the treatment even after considerable periods of time. The discoloration and pitting of the surface of the fruit which has hitherto always been a concomitant feature of the treatment with sodium orthophenyl-phenate, is not present and the surface retains its original color and texture.

The degree of burn, that is the discoloration and pitting of citrus fruit caused by solutions of sodium orthophenyl-phenate is apparently influenced both by the concentration of the fungicidal chemical and the length of time the solution contacts the fruit. The higher the concentration of the sodium orthophenyl-phenate, the more marked is the severity of the burn. However if the solution of a concentration which would ordinarily cause a severe burn is removed from the fruit after a short time interval no burn is apparent indicating that the length of time for which the fruit is exposed to the solution is an important factor in the burning reaction.

When the fruit is wet down with the treating fluid containing sodium orthophenyl-phenate by the usual methods such as showering the fruit or immersing it in a bath, appreciable quantities of the fluid remain clinging to the surface in masses or islands of appreciable depth such as drops, droplets and the like after removal from the wetting medium. As the water evaporates during the drying process, the concentration of phenate in the fluid clinging to the fruit gradually increases with a concomitant increase in the burning effect.

Since drying requires a considerable length of time, the contacting solution is given sufficient opportunity to react with the fruit giving the undesirable burning effect. Furthermore, after drying is complete considerable quantities of the active chemical are deposited on the surface of the fruit. This may contribute to the burning effect since solid sodium orthophenyl-phenate has a tendency to withdraw from the fruit fluid in which it dissolves.

When the surplus fluid remaining on the citrus fruit after showering or immersion is removed by the blotting action of the foamed rubber sheet, a thin film of the fluid is left on the fruit. This film, which imparts a barely perceptible dampness to the surface, dries almost immediately leaving exceedingly minute quantities of the sodium orthophenyl-phenate uniformly distributed over the entire surface of the fruit. The drying is so rapid and the quantity of sodium orthophenyl-phenate deposited on the fruit is so small that no visible damage occurs. Despite the fact that my blotting process leaves such a minute quantity of the phenate solution on the fruit that it cannot cause the usual discoloration and pitting, it is sufficient to inhibit the decay producing organisms for an extended period of time.

I have found that when citrus fruit is treated by my process with an aqueous fluid treating medium containing 2.5 to 3 percent by weight of sodium orthophenyl-phenate and stored at room temperature of from 75 to 90° F. under conditions of high humidity, 90 to 95 percent of the fruit is still free of all decay including the difficult controlled stem-end rot, more than 60 days after treatment. This is true even when a wound about one half inch in diameter and $\frac{3}{16}$ of an inch deep is cut in the fruit and inoculated with decay producing organisms 24 hours before treatment. Fruit similarly wounded and inoculated but untreated decays within 48 hours.

Although the concentration of the sodium orthophenyl-phenate may be varied, I have found that 2.5 to 3 percent by weight gives excellent decay inhibiting results. However concentrations as high as 5 percent may be employed by means of my process without causing any visible burn. Solutions containing as little as 1½ percent are also effective but control of stem-end rot is not as complete as when concentrations of 2.5 to 3 percent are used.

In addition to treating citrus fruit with a decay inhibiting agent, it is desirable to provide the fruit with a thin coating of wax, primarily to retard shrinkage, and secondarily to provide for a polish. This coating of wax is obtained by applying to the fruit an emulsion containing the coating material. An emulsion I have found particularly desirable for the purpose is an aqueous emulsion of paraffin and carnauba wax which is harder than paraffin, because of its superior polishing quality. The amount of the waxes is about 5½ percent of the weight of the emulsion and the ratio of paraffin to carnauba is about 40 to 60%.

Hitherto, the wax containing emulsion has been applied in a separate procedure after the fruit has been subjected to the decay-inhibiting agent. This additional costly and time consuming processing has been necessitated by the fact that the decay inhibiting agents employed, such as borax, are not compatible with the emulsions in sufficient concentration to prevent decay.

I have found that concentration of sodium orthophenylphenate as high as 5% are thoroughly compatible with wax-containing emulsions such as the one described above. The phenate dissolves in the water phase and does not crystallize or otherwise separate from the emulsion. Incorporation of the phenate greatly increases the spreadability of the emulsion.

Combining the decay inhibiting and shrinkage retarding agents into a single fluid medium possesses the important advantages of minimizing the handling of the fruit and eliminating an expensive time consuming processing step.

Before applying the treating emulsion to the fruit, it is desirable that the fruit be washed to free it of dirt. Preferably, surplus wash water clinging to the fruit is removed by blotting off on a foamed rubber sheet by the aforedescribed method in order to avoid dilution of the treating fluid.

The citrus fruit is then thoroughly drenched with an emulsion containing waxes and the sodium orthophenyl-phenate, the latter preferably in 3% concentration. This may be accomplished in several ways. Preferably the fruit is showered with the emulsion. The showering may be applied before the fruit is placed on the foamed rubber sheet or, as shown in Figure 1, while the fruit is on the sheet, the spray being indicated at 6. The fruit is preferably in rolling motion while the emulsion is being applied to ensure that all parts of the surface are contacted by the emulsion. The dampness of the surface of the fruit due to the preliminary washing facilitates the uniform wetting of the surface by the emulsion. The emulsion which drains from the surface of the fruit is absorbed by the foamed rubber. A certain amount is held in the foamed rubber by capillarity and forms a water table below the surface of the foamed rubber sheet. Any excess above the amount retained by capillarity discharges through the sheet which should be so supported as to provide for this discharge.

The emulsion is applied warm, primarily to reduce the viscosity of the emulsion. For best results care must be taken not to raise the temperature of the emulsion as high as the melting point of the waxes present. 100° F. has been found a desirable temperature. This is lower than the melting point of the waxes in the emulsion.

After the fruit is thoroughly drenched with the emulsion, it is removed from the shower or spray and rolled upon the foamed rubber sheet until the surplus moisture has been blotted off. The blotting action is believed to be a combination of capillary action and positive suction effected in the manner previously described, and is so effective as to leave a uniformly distributed continuous film of wax of such thinness that it is estimated that 8 pounds of wax will cover 25,000 square feet of fruit surface.

The thinness and continuity of the wax film obtained by my process are particularly advantageous characteristics. It is known that, while retardation of the shrinkage is beneficial to the keeping qualities of the fruit, excessive inhibition of respiration creates anaerobic conditions within the fruit, that deteriorate its palatability and promote spoilage. The coating must be substantially continuous over the entire fruit, but sufficiently thin to promote some breathing. It is quite important that the applied wax coating shall not crack or peel, as it is likely to do if it is uneven or of substantial thickness, or give the fruit an artificially waxed appearance.

Continuity of the wax film is probably improved by the mechanical action of the foamed rubber sheet. As has been previously stated, the weight of the fruit creates a depressed seat for the fruit. The rubber is stretched in forming the depression, enlarging the mouths of the foramina which open in the depressed surface. As the fruit rolls and the depression shifts, the mouths in contact with the fruit on the leading side progressively expand until they reach the point of greatest depth and then progressively contract on the trailing side. The rubber between the mouths thus executes a wiping action against the surface of the fruit, spreading the wax particles which it contacts, against the surface.

This spreading action of the foamed rubber seems to be the explanation for the somewhat paradoxical observation that the more of the emulsion that is removed by the blotting, the more the shrinkage of the fruit is retarded. If, for example, the fruit is rolled on the rubber only sufficiently to bring the surface once into blotting contact with the rubber, while all surplus emulsion present as drops or droplets appears to have been removed, the surface of the fruit will be more damp than if the rolling is continued to bring the surface a number of times into contact with the rubber. The rate of shrinkage of fruit which has been subjected to the protracted rolling is found to be less than that of fruit which has contacted the rubber but once. This is believed due to the fact that the mechanical wax spreading action of the rubber more thoroughly welds the solid wax particles deposited upon the surface of the fruit from the emulsion, into a continuous coating.

The blotting action does not extend to such emulsion as may be in the stem end depression or in the depths of the wounds, but is so thorough that the general rotund surface of the fruit feels dry to the touch. Presence of the wax film may at this stage be demonstrated by pouring emulsion upon the freshly blotted fruit. The emulsion being predominantly aqueous, will run off the surface of form channels or isolated drops without wetting the fruit.

The presence of the waxes in the emulsion in no way hinders the decay-inhibiting action of the sodium orthophenylphenate dissolved in the aqueous phase. It is believed that the wax film exerts a beneficial action in as much as it apparently retards loss of potency of the fungicidal chemical, such as that caused by volatilization, for an extended period of time. Oranges treated with the wax emulsion containing 3 percent of sodium orthophenyl-phenate and maintained at temperatures of 75° to 90° F. under conditions of high humidity were free of decay more than 60 days after treatment.

Citrus fruit such as oranges tend to lose their original freshness of flavor and to develop a staleness of taste within a relatively short time after picking. I have found that oranges treated shortly after removal from the tree with a wax emulsion containing 3 percent of sodium orthophenyl-phenate retain their original freshness of flavor for extended periods of time. Experts in the citrus industry have tasted oranges more than 60 days after treatment and have not detected any "off" flavor.

It will be understood that although I prefer to incorporate the decay inhibiting sodium orthophenyl-phenate and the shrinkage retarding and polishing waxes into a single fluid treating medium, that the same beneficial results may be obtained by first applying an aqueous solution of the phenate and then the wax emulsion by my method as separate steps although it is preferable that the emulsion contain some phenate to prevent dilution of the chemical applied in the previous step.

It is well known that oranges which are perfectly ripe from an edible point of view may present a green appearance which detracts from their marketability. It has long been the practice to artificially color the skins of such oranges prior to marketing. During the coloring process, the oranges are subjected to conditions of high temperatures and high humidity for sufficiently long periods of time, sometimes as long as 72 hours, to cause an acceleration of the activity of decay producing organisms particularly if the fruit is torn or otherwise bruised. The decay frequently penetrates so deeply into the fruit that it cannot be reached by the decay inhibiting agent applied after the fruit is removed from the coloring rooms. The percentage of decay of artificially colored fruit is, therefore, exceedingly high.

I have found that the decay caused by the decay inducing conditions of the coloring process may be substantially completely eliminated by giving the oranges a preliminary treatment with sodium orthophenyl-phenate prior to placing them in the coloring rooms. This preliminary treatment consists of thoroughly drenching the oranges with an aqueous solution of sodium orthophenyl-phenate, preferably in 2 to 2.5 percent concentration by a spray, shower or other means at a temperature preferably of 100° F. and then subjecting the oranges to the blotting action of a foamed rubber sheet substantially as previously described. The decay inhibiting solution will penetrate and remain in the stem end and any wounds or bruises present and will form a thin, uniformly distributed film on the surface of the orange, thus inhibiting decay during the coloring process. The treating solution should not contain any waxes since these would interfere with the coloring procedure.

After completion of the coloring process, which may be the standard procedure comprising subjecting the oranges to a gassing treatment, washing them and then passing them through dye tanks, the oranges are subjected to the wax emulsion containing sodium orthophenyl-phenate, preferably in 2.5 to 3 percent concentration and blotted on a foamed rubber sheet as previously described. It is essential to reapply the sodium orthophenyl-phenate at this time because the fungicidal chemical applied by the preliminary treatment is substantially all removed by the washing step in the coloring process. Since the preliminary treatment with the phenate has prevented any infection present from penetrating deeply into the fruit, the wax emulsion containing the phenate will be substantially completely effective even after the fruit has remained in the coloring rooms for as long as 72 hours.

If the fruit is not artificially colored, the preliminary treatment with an aqueous solution of sodium orthophenyl-phenate is not necessary and the fruit is treated with the single phenate containing wax emulsion after washing. I have also found that the preliminary treatment with an aqueous solution of sodium orthophenyl-phenate is not necessary when the oranges are kept in the coloring rooms for less than 48 hours since the decay will not penetrate far enough to withstand the action of the phenate contained in the wax emulsion if the emulsion is applied immediately after the coloring process is completed.

The foregoing description illustrates an elemental way of performing my method manually. In treating citrus fruit on a commercial scale, they could be placed in plurality upon the upper end of an inclined sheet of foamed rubber, permitted to roll downward by gravity, this movement being compounded with a lateral rolling movement, the fruit passing progressively through a drenching shower of emulsion near the top of the sheet and then moving downward beyond the drenching zone to a lower portion of the sheet where the surplus emulsion is blotted off. If desired, the drenching may be accomplished before the fruit is placed on the foamed rubber sheet which then acts merely as a blotting mechanism.

As an alternative to applying the emulsion to the fruit in the form of a spray or shower, the foamed rubber sheet may be sufficiently saturated with emulsion so that when the fruit rolls upon it, the weight of the fruit forces up a puddle of emulsion 7 in the leading side of the depression, into which puddle the orange rolls and is wetted, the surplus emulsion being blotted off by the rubber which rises up against the orange on the trailing side. Since the stem end depression may in rolling, carry down an air bubble and thus be excluded from contact with the puddle, this method of wetting with the emulsion will probably not be found as reliable as the application of the emulsion by an overhead spray or shower.

In the commercial practice of the invention the fruit goes through a drying and polishing step following the emulsion treatment, which steps are per se no part of the present invention. The amount of moisture on the surface of the fruit upon leaving the rubber is so small as to make the drying step a very simple operation.

Apparatus has been devised for treating citrus fruit such as oranges, grapefruit, tangerines, lemons and the like, by my method on a commercial scale as a continuous process, which will be made the subject of a separate application for patent.

While I have in the above illustrative embodiment of the invention employed foamed rubber, a known commercial product, as the blotting instrumentality and in some instances as the applicator of the beneficiating liquid or emulsion, it will be understood by those skilled in the art that the use of other materials having similar characteristics to foamed rubber is within the scope of the invention.

It will be evident to those skilled in the art that though I have described preferred embodiments of my invention, various changes and modifications are possible within the scope of the appended claims.

Having thus fully described my invention, I claim:

1. A process for treating citrus fruit comprising thoroughly wetting the fruit including the stem end and tissue exposed in skin wounds with a fluid treating medium comprising water and sodium orthophenyl-phenate in decay inhibiting concentration as an essential active ingredient and removing surplus treating fluid therefrom to leave a thin, substantially uniform film on the generally rotund surface of the fruit without at the same time removing that treating fluid which resides in the stem end and wounds, by rolling the fruit upon the foraminous, normally plane upper surface of a sheet of foamed rubber.

2. A process for treating citrus fruit comprising thoroughly wetting the fruit including the stem end and tissue exposed in skin wounds with an aqueous wax emulsion, in which the waxes are present as solid particles at the temperature of application of the emulsion, said emulsion containing a polishing wax and said emulsion containing in its aqueous phase a decay inhibiting concentration of sodium orthophenyl-phenate, and removing surplus emulsion from surface of said fruit to leave a thin, substantially uniform film on the generally rotund surface by rolling the fruit upon the foraminous, normally plane upper surface of a sheet of foamed rubber.

3. A process for treating citrus fruit comprising thoroughly wetting the fruit including the stem end and tissue exposed in skin wounds with an aqueous treating medium, said fluid treating medium containing dissolved in its aqueous phase 1.5 to 3 percent by weight of sodium orthophenyl-phenate and removing surplus treating fluid therefrom to leave a thin, substantially uniform film on the generally rotund surface without at the same time removing that treating fluid which resides in the stem end and wounds by rolling the fruit upon the foraminous, normally plane upper surface of a sheet of foamed rubber, said sheet being at least partially saturated with said treating fluid.

4. A process for treating citrus fruit comprising thoroughly wetting the fruit including the stem end and tissue exposed in skin wounds with an aqueous solution of sodium orthophenyl-phenate, said solution containing 3 percent by weight of said sodium orthophenyl-phenate and removing surplus solution therefrom to leave a thin, substantially uniform film on the generally rotund surface of the fruit without at the same time removing that solution which resides in the stem end and wounds, by rolling the fruit upon the foraminous normally plane upper surface of a sheet of foamed rubber, said sheet being at least partly saturated with said solution.

5. A process for treating citrus fruit comprising thoroughly wetting the fruit including the stem end and tissue exposed in skin wounds with an aqueous wax emulsion, said emulsion containing dissolved in its aqueous phase 3 percent by weight of sodium orthophenyl-phenate and removing surplus emulsion therefrom to leave a thin, substantially uniform film on the rotund surface by rolling the fruit upon the foraminous, normally plane upper surface of a sheet of foamed rubber, said sheet being at least partially saturated with said emulsion.

6. A process for treating citrus fruit comprising thoroughly wetting the fruit by subjecting it to a shower of an aqueous wax emulsion, said emulsion containing dissolved in its aqueous phase a decay inhibiting concentration of sodium orthophenyl-phenate and removing surplus emulsion from surface of said fruit to leave a thin, substantially uniform film on the generally rotund surface by rolling the fruit upon the foraminous, normally plane upper surface of a sheet of foamed rubber.

7. A process for treating citrus fruit comprising rolling the fruit upon the foraminous, normally plane upper surface of a sheet of foamed rubber, said sheet being of a thickness which exceeds the height of the liquid table that it is capable of sustaining by capillarity and said sheet being saturated with an aqueous fluid treating medium containing a decay inhibiting concentration of sodium orthophenyl-phenate in the aqueous phase, to the extent that a puddle of treating fluid is present against the leading side of the fruit as it is rolled, whereby treating fluid is applied and surplus removed, successively as fruit contacting surface areas of said sheet pass from the leading side to the trailing side of the fruit.

8. A process for treating citrus fruit comprising thoroughly wetting the fruit by subjecting it to a shower of a fluid treating medium comprising water and sodium orthophenyl-phenate in decay inhibiting concentration as an essential active ingredient and removing surplus treating fluid from surface of said fruit to leave a thin, substantially uniform film on the generally rotund surface by rolling the fruit upon the foraminous, normally plane upper surface of a sheet of foamed rubber.

9. A process for treating citrus fruit comprising, thoroughly wetting the fruit including the stem end and tissue exposed in skin wounds with fluid treating medium comprising water and sodium orthophenyl-phenate of decay inhibiting concentration as an essential active ingredient, and removing surplus treating fluid therefrom to leave a thin, substantially uniform film on the generally rotund surface of the fruit without at the same time removing that treating fluid which resides in the stem end and wounds by bringing the fruit into pressure contact with the foraminous, normally plane surface of a sheet of foamed rubber, and producing a relative rolling movement between said fruit and said foamed rubber.

10. A process for treating citrus fruit comprising thoroughly wetting the fruit including the stem end and tissue exposed in skin wounds with an aqueous wax emulsion, said emulsion containing dissolved in its aqueous phase a decay inhibiting concentration of sodium orthophenyl-phenate, and removing surplus emulsion therefrom to leave a thin, substantially uniform film on the generally rotund surface by rolling the fruit under pressure of its weight upon the foraminous, normally plane surface of a sheet of foamed rubber.

11. A process for treating citrus fruit comprising thoroughly wetting the fruit including the stem end and tissue exposed in skin wounds with an aqueous solution of sodium orthophenyl-phenate in decay inhibiting concentration, removing surplus solution therefrom to leave a thin, substantially uniform film on the generally rotund surface by rolling the fruit under pressure of its weight upon the foraminous, normally plane surface of a sheet of foamed rubber, then thoroughly wetting the fruit with an aqueous emulsion of waxes and removing surplus emulsion by rolling the fruit under pressure of its weight upon the foraminous, normally plane surface of a sheet of foamed rubber.

12. A process for treating citrus fruit comprising thoroughly wetting the fruit including the stem end and tissue exposed in skin wounds with an aqueous solution of sodium orthophenyl-phenate in decay inhibiting concentration, removing surplus solution therefrom to leave a thin, substantially uniform film on the generally rotund surface by rolling the fruit under pressure of its weight upon the foraminous, normally plane surface of a sheet of foamed rubber, then subjecting the fruit to standard coloring procedures and then thoroughly wetting the fruit with an aqueous emulsion of waxes, said emulsion containing dissolved in its aqueous phase a decay inhibiting concentration of sodium orthophenyl-phenate and removing surplus emulsion therefrom to leave a thin, substantially uniform film on the generally rotund surface by rolling the fruit under pressure of its weight upon the foraminous, normally plane surface of a sheet of foamed rubber.

13. A process for treating citrus fruit comprising thoroughly wetting the fruit including the stem end and tissue exposed in skin wounds with an aqueous solution of sodium orthophenyl-phenate, said solution containing 1.5 to 3 percent by weight of said sodium orthophenyl-phenate and removing surplus solution therefrom to leave a thin, substantially uniform film on the generally rotund surface of the fruit without at the same time removing that solution which resides in the stem end and wounds, by rolling the fruit under pressure of its weight upon the foraminous, normally plane surface of a sheet of foamed rubber, said sheet being at least partly saturated with said solution.

14. A process for treating citrus fruit comprising thoroughly wetting the fruit including the stem end and tissue exposed in skin wounds with an aqueous wax emulsion, said emulsion containing dissolved in its aqueous phase 1.5 to 3 percent by weight of sodium orthophenyl-phenate and removing surplus emulsion therefrom to leave a thin, substantially uniform film on the generally rotund surface without at the same time removing that emulsion which resides in the stem end and wounds by rolling the fruit under pressure of its weight upon the foraminous, normally plane surface of a sheet of foamed rubber, said sheet being at least partially saturated with said emulsion.

15. A process for treating citrus fruit comprising, rolling the fruit under pressure of its weight upon the foraminous, normally plane surface of a sheet of foamed rubber, said sheet being of a thickness which exceeds the height of the liquid table that it is capable of sustaining by capillarity, and said sheet being saturated with a solution comprising water and sodium orthophenyl-phenate in decay inhibiting concentration, to the extent that a puddle of emulsion is present against the leading side of the fruit as it is rolled, whereby solution is applied and surplus removed successively as fruit contacting surface areas of said sheet pass from the leading side to the trailing side of the fruit.

ERNEST M. BROGDEN.

REFERENCES CITED

The following references are of record in the file of this patent:

UNITED STATES PATENTS

| Number | Name | Date |
|---|---|---|
| 1,618,159 | Ahlburg | Feb. 22, 1927 |
| 1,700,908 | Ricketts | Feb. 5, 1929 |
| 1,964,429 | Eberts | June 26, 1934 |
| 2,042,857 | Nelson | June 2, 1936 |
| 2,054,392 | Sharma | Sept. 15, 1936 |
| 2,070,936 | Trowbridge | Feb. 16, 1937 |
| 2,129,936 | Johnson | Sept. 13, 1938 |
| 2,145,495 | Paxton | Jan. 31, 1939 |